US009507281B2

(12) United States Patent  
Takezawa et al.

(10) Patent No.: US 9,507,281 B2  
(45) Date of Patent: Nov. 29, 2016

(54) ORGANIC PHOTOCONDUCTOR AND ELECTROPHOTOGRAPHIC APPARATUS AND PROCESS CARTRIDGE INCLUDING THE ORGANIC PHOTO CONDUCTOR

(71) Applicant: Samsung Electronics Co., Ltd., Suwon-si, Gyeonggi-do (KR)

(72) Inventors: Manabu Takezawa, Kanagawa (JP); Tomohito Chokan, Kanagawa (JP); Osamu Watanabe, Kanagawa (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/980,273

(22) Filed: Dec. 28, 2015

(65) Prior Publication Data

US 2016/0187793 A1    Jun. 30, 2016

(30) Foreign Application Priority Data

Dec. 26, 2014  (JP) .................................. 2014-264329  
Aug. 21, 2015  (KR) ........................ 10-2015-0118275

(51) Int. Cl.  
*G03G 5/147* (2006.01)  
*G03G 5/043* (2006.01)

(52) U.S. Cl.  
CPC ..................................... *G03G 5/043* (2013.01)

(58) Field of Classification Search  
CPC ............. G03G 5/147; G03G 5/14704; G03G 5/14708; G03G 5/14713  
See application file for complete search history.

(56) References Cited

U.S. PATENT DOCUMENTS

| | | |
|---|---|---|
| 5,374,494 A | 12/1994 | Kashimura et al. |
| 5,698,357 A | 12/1997 | Inoue et al. |
| 6,492,081 B2 | 12/2002 | Morikawa et al. |
| 7,147,978 B2 | 12/2006 | Zhu et al. |
| 7,205,079 B2 | 4/2007 | Wu et al. |
| 8,273,511 B2 | 9/2012 | Nukada et al. |
| 9,049,007 B2 | 6/2015 | Hong et al. |
| 2008/0199217 A1 | 8/2008 | Iwamoto et al. |

FOREIGN PATENT DOCUMENTS

| | | |
|---|---|---|
| EP | 1744220 A2 | 6/2006 |
| JP | 1993-045920 A | 2/1993 |
| JP | 1994-282095 A | 10/1994 |
| JP | 1995-019073 B2 | 3/1995 |
| JP | 1996-179542 A | 7/1996 |
| JP | 1999-095473 A | 4/1999 |
| JP | 1999-202531 A | 7/1999 |
| JP | 2000-310871 A | 11/2000 |
| JP | 3262488 B2 | 12/2001 |
| JP | 2002-082466 A | 3/2002 |
| JP | 3336838 B2 | 8/2002 |

(Continued)

*Primary Examiner* — Hoa V Le  
(74) *Attorney, Agent, or Firm* — Cantor Colburn LLP

(57) ABSTRACT

An organic photoconductor including an electrically conductive substrate, a photosensitive layer disposed on the electrically conductive substrate, and a protection layer disposed on the photosensitive layer, wherein the protection layer includes a polymer composition and a plurality of electrically conductive metal oxide particles, and wherein the polymer composition is a product of a curing reaction with a multifunctional spherical dendrimer, a first multifunctional acryl compound having a urethane bond, and a second multifunctional acryl compound having a silicon-containing group and a fluorine-containing group.

21 Claims, 8 Drawing Sheets

LUBRICIOUS PART: $R_6\text{-}(CF_2CF_2)_r\text{-}R_5COO\text{-}\underset{\underset{CH_2}{|}}{\overset{\overset{CH_2}{|}}{C}}\text{-}CH_3$ PHOTOREACTIVE PART: $CH_2C(CH_3)COOCH_2CH_2NHCOOCH_2CH_2COO\text{-}\underset{\underset{CH_2}{|}}{\overset{\overset{CH_2}{|}}{C}}\text{-}CH_3$ SILANE COUPLING PART: $(CH_3O)_3SiC_3H_6COO\text{-}\underset{\underset{CH_2}{|}}{\overset{\overset{CH_2}{|}}{C}}\text{-}CH_3$

MAIN CHAIN

(56) References Cited

FOREIGN PATENT DOCUMENTS

| | | |
|---|---|---|
| JP | 2003-066642 A | 3/2003 |
| JP | 2003-177564 A | 6/2003 |
| JP | 2005-107490 A | 4/2005 |
| JP | 2005-208112 A | 8/2005 |
| JP | 2006-038919 A | 2/2006 |
| JP | 2008-261971 A | 10/2006 |
| JP | 2008-233893 A | 10/2008 |
| JP | 2009-014915 A | 1/2009 |
| JP | 4702448 B2 | 3/2011 |
| JP | 2011-128546 A | 6/2011 |
| JP | 2011-154067 A | 8/2011 |
| JP | 2011-170129 A | 9/2011 |
| JP | 4868150 B2 | 11/2011 |
| JP | 2012-098591 A | 5/2012 |
| JP | 2014-002351 A | 1/2014 |
| JP | 5564831 B2 | 6/2014 |
| JP | 2014-136426 A | 7/2014 |

…

ORGANIC PHOTOCONDUCTOR AND ELECTROPHOTOGRAPHIC APPARATUS AND PROCESS CARTRIDGE INCLUDING THE ORGANIC PHOTO CONDUCTOR

CROSS-REFERENCE TO RELATED APPLICATIONS

This application claims priority to and the benefit of Japanese Patent Application No. 2014-264329, filed on Dec. 26, 2014, and Japanese Patent Application No. 2014-266821, filed on Dec. 27, 2014, in the Japanese Intellectual Property Office, and Korean Patent Application No. 10-2015-0118275, filed on Aug. 21, 2015, in Korean Intellectual Property Office, the contents of which are incorporated herein in their entireties by reference.

BACKGROUND

1. Field

The present disclosure relates to an organic photoconductor, an electrophotographic apparatus including the organic photoconductor, and a process cartridge including the organic photoconductor.

2. Description of the Related Art

An organic photoconductor (OPC) has advantages of (1) excellent optical characteristics in terms of a wide wavelength range of optical absorption and a large extent of optical absorption, (2) electrical characteristics in terms of high sensitivity and stable charging properties, (3) selection of various materials, and (4) ease of manufacture with low costs. The OPC having these advantages has been used to replace an inorganic photoconductor used in a copying machine, a facsimile machine, a laser printer a multifunction printer thereof, and the like.

Recently, there have been many requests to increase the operating speed of an image forming apparatus, provide a maintenance-free image forming apparatus, as well as a photoconductor with high durability. The OPC of the related art mainly includes a low molecular charge transporting material and a high molecular material, such as polycarbonate. When the OPC of the related art is used in a soft and repetitive manner during an electrophotographic process, a surface of the photoconductor and a cleaning blade are worn down due to mechanical stress caused by a developing or cleaning system of the photoconductor. Also, there have been many requests for granulation of toner particles in terms of high definition quality, as well as for improvement of the cleaning properties of the OPC. In this regard, trials for increasing a rubber hardness of the cleaning blade and a pressure on a contact surface of the cleaning blade have been made. However, in this case, a frictional resistance between the surface of the photoconductor and the cleaning blade increases so that a reverse motion of the cleaning blade or abnormal squealing sound may readily occur. In addition, in the trials, abrasion of the surface of the photoconductor occurs, and thus, scratches are more likely to occur on the surface of the photoconductor.

Due to the abrasion of the surface of the photoconductor, a thickness of layers in the photoconductor may be reduced. Such reduction in the thickness of layers may affect a contact pressure with respect to the cleaning blade, which may result in poor wiping of the cleaning blade. In addition, when scratches are made on the surface of the photoconductor, toner particles may be caught in the scratches, which may cause electrical hazards. Accordingly, a decrease in a sensitivity and electric charge of the photoconductor may occur as well as a decrease in an image density or generation of an abnormal image. In addition, topical scratches may also cause image defects, such as stripe stains, due to poor cleaning properties.

Thus, to obtain stable images over a long period of time, it is important to maintain excellent cleaning properties of the photoconductor by suppressing a time-dependent increase in the frictional resistance of the surface thereof, and at the same time, to improve a resistance against abrasion of or scratch on the surface of the photoconductor. There still remains a need for a material which would address the above issues.

SUMMARY

Provided are an organic photoconductor and an electrophotographic apparatus and a process cartridge that include the organic photoconductor, wherein a time-dependent increase in a frictional resistance of a surface of the organic photoconductor is suppressed, and at the same time, the organic photoconductor has an improved resistance against abrasion, thereby obtaining a stable image over a long period of time.

Additional aspects will be set forth in part in the description which follows and, in part, will be apparent from the description, or may be learned by practice of the presented exemplary embodiments.

According to an aspect of an exemplary embodiment, there is provided an organic photoconductor, the organic photoconductor including:
an electrically conductive substrate;
a photosensitive layer disposed on the electrically conductive substrate; and
a protection layer disposed on the photosensitive layer,
wherein the protection layer includes a polymer composition and a plurality of electrically conductive metal oxide particles, and
wherein the polymer composition is a product of a curing reaction with a multifunctional spherical dendrimer, a first multifunctional acryl compound having a urethane bond, and a second multifunctional acryl compound having a silicon-containing group and a fluorine-containing group.

In an exemplary embodiment, the first multifunctional acryl compound may have a weight average molecular weight of about 500 Daltons or greater and may include tri- or higher multi-functional urethane (meth)acrylate including at least one of an acryloyl group, a methacryloyl group, or a vinyl group.

In an exemplary embodiment, the multifunctional spherical dendrimer may include at least one of polyacrylate or polyester acrylate, wherein each of the polyacrylate and polyester acrylate has a weight average molecular weight of about 1,000 Daltons or greater and about 25,000 Daltons or less, and wherein each of the polyacrylate and polyester acrylate includes at least one polymerizable functional group selected from an acryloyl group, a methacryloyl group, and a vinyl group.

In an exemplary embodiment, a mixing amount of the multifunctional spherical dendrimer in the polymer composition may be about 10 percent by mass or greater and about 50 percent by mass or less based on the total of 100 percent by mass of the multifunctional spherical dendrimer, the first multifunctional acryl compound, and the second multifunctional acryl compound.

In an exemplary embodiment, the silicon-containing group of the second multifunctional acryl compound may include a dimethyl-siloxane group, the fluorine-containing group of the second multifunctional acryl compound may include at least one of a perfluoro polyether group or a perfluoro alkyl group, and the second multifunctional acryl compound may include a polyacrylate unit.

In an exemplary embodiment, a mixing amount of the second multifunctional acryl compound in the polymer composition may be about 5 percent by mass or greater and about 50 percent by mass or less based on the total of 100 percent by mass of the multifunctional spherical dendrimer, the first multifunctional acryl compound, and the second multifunctional acryl compound.

In an exemplary embodiment, the electrically conductive metal oxide particle may include at least one of tin oxide, titanium oxide, indium oxide, zinc oxide, antimony oxide, phosphorus-containing tin oxide, or antimony-containing tin oxide. In addition, the electrically conductive metal oxide particle may have an average primary particle diameter of about 5 nanometers or greater and about 300 nanometers or less.

In an exemplary embodiment, a mixing amount of the electrically conductive metal oxide particles in the polymer composition may be about 10 parts by mass or greater and about 40 parts by mass or less based on the total of 100 parts by mass) of the multifunctional spherical dendrimer, the first multifunctional acryl compound, and the second multifunctional acryl compound.

In an exemplary embodiment, the electrically conductive metal oxide particle may further include a silane coupling agent disposed on a surface thereof, wherein the silane coupling agent is a grafted aggregate including on a side chain a silane coupling part for coupling with the electrically conductive metal oxide, a photoreactive part, and a lubricious part including at least one of fluorine or silicon.

In an exemplary embodiment, the silane coupling agent may be a grafted aggregate including an acryl main chain.

In an exemplary embodiment, the silane coupling part of the silane coupling agent may include a part represented by Formula 3.

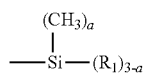

Formula 3

In Formula 3,
R$_1$ may be an alkoxy group, and
a may be an integer from 0 to 2.

In an exemplary embodiment, the photoreactive part of the silane coupling agent may include a part represented by Formula 4.

—COO—NH—R$_2$—Y     Formula 4

In Formula 4,
R$_2$ may be an alkyl group, and
Y may be a photoreactive functional group.

In an exemplary embodiment, the lubricious part of the silane coupling agent may include a part represented by Formula 5.

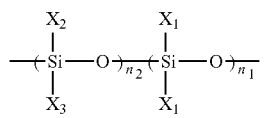

Formula 5

In Formula 5,
X$_1$ may be an alkyl group,
X$_2$ and X$_3$ may each be independently an alkyl group or an aryl group, and
n$_1$ and n$_2$ may each be independently an integer from 1 to 500.

In an exemplary embodiment, the lubricious part of the silane coupling agent may include a part represented by Formula 6.

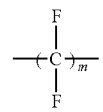

Formula 6

In Formula 6, m may be an integer from 1 to 400.

According to an aspect of another exemplary embodiment, there is provided an electrophotographic apparatus including the organic photoconductor.

According to an aspect of another exemplary embodiment, there is provided a process cartridge including the organic photoconductor.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
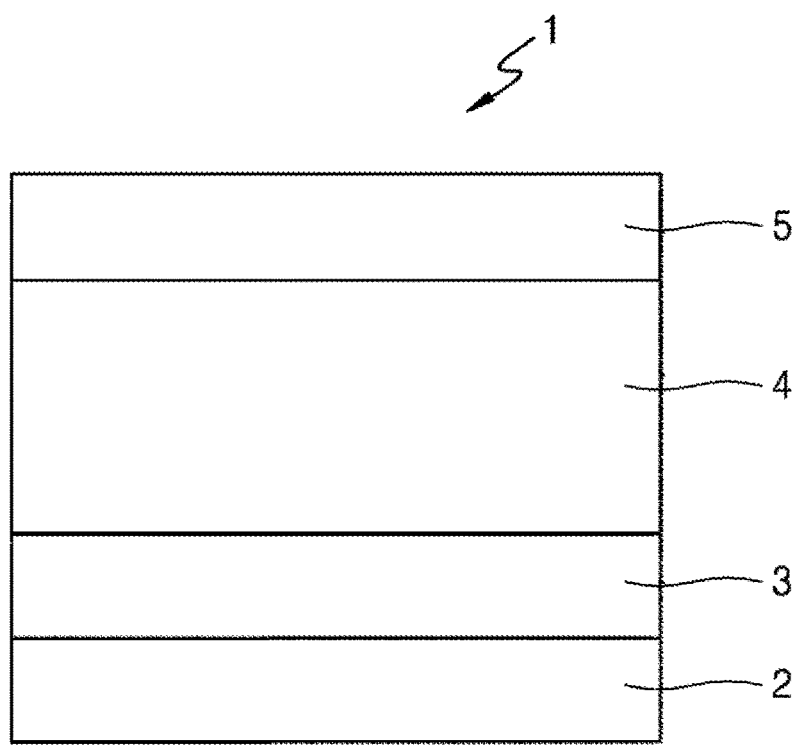
FIG. 1 illustrates a schematic cross-sectional view of an organic photoconductor according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Throughout the specification, when a term "acryl" or "acrylate" used herein refers to not only acryl or acrylate, but also methacryl or methacrylate, and also refers to a combination thereof, unless otherwise described. The term can be also written as (meth)acryl or (meth)acrylate. In contrast, the term "acryloyl" refers only to groups of the formula $H_2C=CH_2C(=O)-$ and "methacryloyl" refers only to groups of the formula $H_2C=CH(CH_3)C(=O)-$.

Organic Photoconductor (OPC)

An organic photoconductor (OPC) according to an exemplary embodiment may include an electrically conductive substrate, a photosensitive layer, and a protection layer that are sequentially stacked on the electrically conductive substrate, wherein the photosensitive layer includes a charge generation layer and a charge transport layer.

FIG. 1 illustrates a schematic cross-sectional view of an OPC 1 according to an exemplary embodiment. The OPC 1 includes an electrically conductive support 2, a charge generation layer 3 disposed on the electrically conductive support 2, a charge transport layer 4 disposed on the charge generation layer 3, and a protection layer 5 disposed on the charge transport layer 4.

Electrically Conductive Support

As the electrically conductive support 2 used herein, any material that is electrically conductive may be used. For example, the electrically conductive support 2 may be in the form of a drum, sheet, or belt using a metal, such as aluminum (Al), chrome (Cr), nickel (Ni), zinc (Zn), iron (Fe), copper (Cu), gold (Au), silver (Ag), platinum (Pt), and stainless steel, or using an alloy of the metal. For example, the electrically conductive support 2 may be a plastic film on which Al or a metal foil equivalent to Al is laminated, or a plastic film on which Al, indium oxide, or tin oxide is deposited. In another example, the electrically conductive support 2 may be a metal, plastic film, or paper sheet on which a conductive layer is formed by coating a conductive material alone or in combination with a binder polymer.

Photosensitive Layer

The photosensitive layer may be classified into a laminated type in which the charge generation layer 3 and the charge transport layer 4 are laminated on one another, and a single-layered type in which the charge generation layer 3 and the charge transport layer 4 are integrally combined together. In an exemplary embodiment, any of the laminated type and the single-layered type may be used.

Laminated Type Photosensitive Layer

A laminated type photosensitive layer includes layers that are each independently responsible for charge generation and charge transportation. Thus, in regard to configuration of layers included in the laminated type photosensitive layer, the layers may have a structure in which a charge generation layer and a charge transport layer are laminated on a substrate. A sequence of laminating the layers is not particularly limited. However, in consideration of a number of charge generation materials that lack chemical stability, it is preferable to laminate a charge transport layer on a charge generation layer because the charge generation materials may cause reduction in charge generation efficiency upon exposure to acidic gases of discharge products that are produced from a charger during an electrophotograph imaging process.

Charge Generation Layer

The charge generation layer 3 may be mainly formed of a charge generation material having capability of charge generation. If necessary, the charge generation layer 3 may further include a binder polymer. The charge generation layer 3 may include a charge generation material that is known in the art. Examples of the charge generation material include monoazo pigment, disazo pigment, asymmetric disazo pigment, triazo pigment, azo pigment having a carbazole skeleton, azo pigment having a distyrylbenzene skeleton, azo pigment having a triphenylamine skeleton, azo pigment having a diphenylamine skeleton, perylene pigment, and phthalocyanine pigment. The charge generation material may be used alone or in combination with two or more other materials. In consideration of obtaining good electrical properties, the charge generation layer may include, for example, at least one of oxo-titanyl phthalocyanine or gallium phthalocyanine.

Examples of the binder polymer that is optionally used for forming the charge generation layer 3 include polyamide, polyurethane, epoxy polymer, polyketone, polycarbonate, silicone polymer, acryl polymer, polyvinylbutyral, polyvinylformal, and polyvinyl ketone. The binder polymer may be used alone or in combination with two or more materials.

The charge generation layer 3 may have a thickness in a range between about 0.01 micrometers ($\mu$m) and about 5 $\mu$m, and for example, between about 0.05 $\mu$m and about 3 $\mu$m.

Charge Transport Layer

The charge transport layer 4 may have a structure configured to transport a charge, and is mainly formed of a charge transport material and a binder polymer. The charge transport layer 4 may include, as the charge transport material, a hole transport material, and if necessary, may further include an electron transport material. Examples of the hole transport material include poly(N-vinylcarbazole) and a derivative thereof, poly($\gamma$-carbazolyl-ethyl-glutamate) and a derivative thereof, pyreneformaldehyde condensate and a derivative thereof, polyvinyl pyrene, polyvinyl phenanthrene, polysilane, an oxazole derivative, an oxadiazole derivative, an imidazole derivative, a monoaryl derivative, a diarylamine derivative, a triarylamine derivative, a stilbene derivative, an $\alpha$-phenylstilbene derivative, an aminobiphenyl derivative, a benzidine derivative, a diarylmethane derivative, a triarylmethane derivative, 9-styrylanthracene derivative, a pyrazoline derivative, a divinylbenzene derivative, a hydrazone derivative, an indene derivative, a butadiene derivative, a pyrene derivative, a bis-stilbene derivative, a distyrylbenzene derivative, and an enamine derivative. The hole transport material may be used alone or in combination with two or more materials.

The binder polymer may be a thermoplastic or thermosetting polymer, and examples thereof include polystyrene, styrene-acrylonitrile copolymer, styrene-butadiene copolymer, styrene-maleic anhydride copolymer, polyester, polyvinyl chloride, vinyl chloride-vinyl acetate copolymer, polyvinyl acetate, polycarbonate polymer, and polyarylate polymer.

The charge transport layer 4 may have a thickness in a range between about 5 $\mu$m and about 40 $\mu$m, and for example, between about 10 $\mu$m and about 35 $\mu$m.

A coating process of a composition for forming the charge generation layer 3 and a composition for forming the charge transport layer 4 may be performed according to method known in the art, such as a dip coating method, a ring coating method, a roll coating method, a wire-winding load coating method, or a spray coating method.

Protection Layer

The protection layer 5 may include a polymer composition and a plurality of electrically conductive metal oxide particles, the polymer composition being prepared through a curing reaction with a multifunctional spherical dendrimer, a first multifunctional acryl compound having a urethane bond, and a second multifunctional acryl compound having a silicon-containing group and a fluorine-containing group in a molecule.

Figure 2:
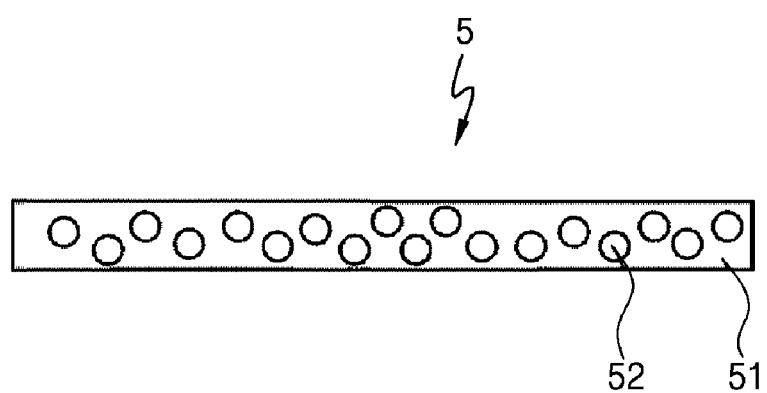
FIG. 2 illustrates a schematic cross-sectional view of a protection layer of the organic photoconductor of FIG. 1 according to an exemplary embodiment.

FIG. 2 illustrates a schematic cross-sectional view of the protection layer 5 according to an exemplary embodiment. The protection layer 5 includes a polymer composition 51 and a plurality of electrically conductive metal oxide particles 52 dispersed in the polymer composition 51.

The polymer composition 51 may be prepared through curing reaction with the multifunctional spherical dendrimer, the first multifunctional acryl compound having a urethane bond, and the second multifunctional acryl compound having a silicon-containing group and a fluorine-containing group in a molecule.

The first multifunctional acryl compound may include a urethane bond within the molecule, and at the same time, may include a plurality of polymerizable functional groups. The inclusion of the urethane bond within the molecule may cause formation of hydrogen bonds between the urethane bonds of different molecules, which may result in formation of a physically cross-linked structure. Accordingly, the protection layer 5 may have a further improved hardness and resistance against scratches. In addition, adhesion of the protection layer 5 to the photosensitive layer may become strong.

The plurality of the polymerizable functional groups included in the first multifunctional acryl compound may include at least one of an acryloyl group, a methacryloyl group, or a vinyl group, and for example, may include an acryloyl group. In terms of formation of the cross-linked structure, an appropriate number of the plurality of the polymerizable functional groups to be included in the molecule may be 3 or more, and for example, may be 4 or more.

A material for forming the first multifunctional acryl compound is not particularly limited, but may be an oligomer. As a starting substance for a curing (i.e., cross-linking) reaction, an oligomer may be used instead of a low molecular weight monomer, and accordingly, a cross-linked structure having entanglement between molecules of the oligomer may be formed. In this regard, the protection layer 5 may have a further improved hardness and resistance against scratches.

In consideration of improvement of a hardness of the protection layer 5, the first multifunctional acryl compound may have a weight average molecular weight (Mw) of about 500 Daltons (Da) or greater, e.g., about 600 Da or greater, about 800 Da or greater, or about 1,000 Da or greater. In addition, in consideration of formation of a compact cross-linked structure, the first multifunctional acryl compound may have a weight average molecular weight Mw of about 4,500 Da or less, e.g., about 2,500 Da or less.

A detailed example of the first multifunctional acryl compound includes a urethane acrylate oligomer having a plurality of acryloyl groups. The urethane acrylate oligomer may be obtained by, for example, a reaction between a polyisocyanate compound, which is produced by a reaction between polyol and diisocyanate, and an acrylate monomer having a hydroxyl group.

A detailed example of the first multifunctional acryl compound includes UV-76056 (manufactured by NIPPON GOHSEI CHEMICALS), which is a urethane acrylate oligomer.

The multifunctional spherical dendrimer may be a spherical oligomer or polymer, each of the spherical oligomer or polymer has a dendritic structure that is regularly branched from the center, and the multifunctional spherical dendrimer may have a polymerizable functional group in the molecule.

The polymerizable functional group may be positioned on an end of its side chain. As the polymerizable functional group used herein, any material that is capable of reacting with the first multifunctional acryl compound may be used.

A skeleton molecule of the multifunctional spherical dendrimer may include at least one of polyacrylate or polyester acrylate, and for example, may include polyester acrylate. Alternatively, the skeleton molecule may be in the form of a copolymer including multiple types of monomer units.

The multifunctional spherical dendrimer may have a weight average molecular weight Mw of about 1,000 Da or greater, e.g., about 1,500 Da or greater and about 25,000 Da or less. In addition, the multifunctional spherical dendrimer may have a single peak at a position corresponding to a molecular weight thereof.

Examples of the multifunctional spherical dendrimer include Viscoat #1000 and Star-501 (manufactured by OSAKA Organic Chemical Industry Ltd.). Viscoat #1000 includes polybranched (dendrimer-type) polyester acrylate as a main substance, the polybranched (dendrimer-type) polyester acrylate having an acrylate group positioned on an end. Viscoat #1000 has a weight average molecular weight Mw of about 1,570 Da, and a number of functional groups thereof is 14. Star-501 includes dipentaerythritol as a core, and polybranched (dipentaerythritol hexaacrylate (DPHA)-linking type) polyacrylate as a main substance, the polybranched (dipentaerythritol hexaacrylate (DPHA)-linking type) polyacrylate having an acrylate group positioned on an end. Star-501 has a weight average molecular weight Mw of about 18,100 Da.

The multifunctional second multifunctional acryl compound may include a silicon-containing group and a fluorine-containing group in a molecule, and at the same time, may include a plurality of polymerizable functional groups. The silicon-containing group may be, for example, siloxane, such as a dimethyl-siloxane group. The fluorine-containing group may be, for example, at least one of a perfluoro polyether group or a perfluoro alkyl group. For example, the fluorine-containing group may be a perfluoro ether group. A detailed example of the perfluoro ether group includes a repeating structure represented by $-(O-CF_2)-$, $-(O-CF_2CF_2)-$, $-(O-CF_2CF_2CF_2)-$, or $-(O-CF_2C(CF_3)F)-$. As the plurality of the polymerizable functional group used herein, a material that is capable of reacting with the first multifunctional acryl compound and the multifunctional spherical dendrimer may be used. For example, the plurality of the polymerizable functional group may include at least one of an acryloyl group, a methacryloyl group, or a vinyl group, and for example, may be an acryloyl group. In terms of formation of the cross-linked structure, an appropriate number of the plurality of the polymerizable functional groups to be included in the molecule may be 5 or more.

The second multifunctional acryl compound may include, for example, a multifunctional polymer or oligomer, each of the multifunctional polymer or oligomer includes a multifunctional acrylate unit to which dipentaerythritol acrylate represented by Formula 1 is bonded; a unit including dimethyl siloxane represented by Formula 2; and a unit including the above-described perfluoro ether group. The multifunctional acrylate unit is not particularly limited to dipentaerythritol acrylate so long as it has multifunctionality. The unit including dimethyl siloxane represented by Formula 2 may be replaced by a unit including siloxane. In addition, a unit including a perfluoro alkyl group may replace the unit including the above-described perfluoro ether group, or may be used in addition to the unit including the above-described perfluoro ether group. In an exemplary embodiment, the second multifunctional acryl compound may have a urethane bond in a molecule.

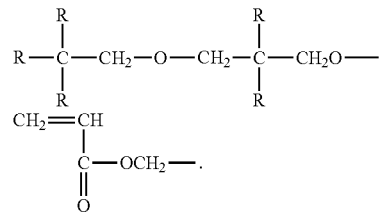

Formula 1

In Formula 1, R may be

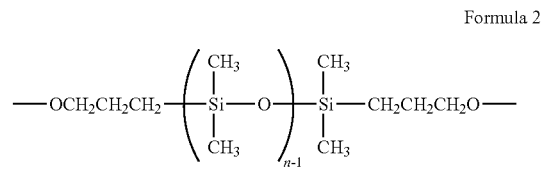

Formula 2

Formula 2, n may be an integer from 1 to 500, e.g., from 1 to 300, and from 10 to 200.

The second multifunctional acryl compound may have a weight average molecular weight Mw of about 5,000 Da or greater, e.g., about 10,000 Da or greater. The second multifunctional acryl compound may have a weight average molecular weight Mw of about 20,000 Da or less, e.g., about 15,000 Da or less.

A detailed example of the second multifunctional acryl compound includes AF-300 (manufactured by NIPPON GOHSEI CHEMICALS). AF-300 may be a polymer having a weight average molecular weight Mw of about 10,000 Da, the polymer consisting of dipentaerythritol acrylate, an isocyanate group-containing acrylate, a polydimethylsiloxane unit, a perfluoro ether and/or perfluoro alkyl unit.

The polymer composition prepared by mixing and curing the multifunctional spherical dendrimer, the first multifunctional acryl compound, and the multifunctional second multifunctional acryl compound may be compatible with high hardness and stress relaxation, and at the same time, may also maintain low friction resistance for a long period of time even if micro-abrasion proceeds.

The first multifunctional acryl compound and the multifunctional spherical dendrimer may contribute to forming a cross-linked structure having a high molecular weight including the spherical dendrimer embedded therein. Due to a region where bonds are tightly formed by intramolecular bonding among the spherical dendrimers, and a region where intramolecular bonding among the spherical dendrimers is formed, the polymer composition may accordingly have macro properties that are compatible with high hardness and stress relaxation throughout the polymer composition.

In addition, the inclusion of the second multifunctional acryl compound having the silicon-containing group and the fluorine-containing group may reduce a frictional resistance on a surface of the polymer composition. The second multifunctional acryl compound may be simply dispersed in the polymer composition, and furthermore, may also form a cross-linked structure with the first multifunctional acryl compound and the multifunctional spherical dendrimer. That is, unlike a case of adding fluorine polymer particles, the second multifunctional acryl compound may be uniformly distributed and fixed in the polymer composition undergoing a curing reaction. In addition, unlike a case of adding a lubricating material having a low molecular weight, the second multifunctional acryl compound may be present not only on a surface of the polymer composition, but also in the polymer composition. Accordingly, even if the surface of the polymer composition is mechanically abraded, the polymer composition may maintain a low friction resistance on the surface thereof. Thus, a time-dependent increase in a frictional resistance on a surface of the OPC may be suppressed, and at the same time, the OPC may have an improved resistance against abrasion.

In regard to the combination use of the multifunctional spherical dendrimer, the first multifunctional acryl compound, and the second multifunctional acryl-based compound, a mixing amount of the first multifunctional acryl compound may be about 40 percent by mass (mass %) or greater and about 90 mass % or less, e.g., about 80 mass % or less, in consideration of the formation of the cross-linked structure having sufficient physical properties. In regard to the combination use of the multifunctional spherical dendrimer, the first multifunctional acryl compound, and the second multifunctional acryl compound, a mixing amount of the multifunctional spherical dendrimer may be about 10 mass % or greater, e.g., about 20 mass % or greater, and about 50 mass % or less, in consideration of the implementation of a sufficiently high hardness. In regard to the combination use of the multifunctional spherical dendrimer, the first multifunctional acryl compound, and the second multifunctional acryl compound, a mixing amount of the second multifunctional acryl compound may be about 5 mass % or greater, e.g., about 10 mass % or greater, and about 50 mass % or less, e.g., about 25 mass % or less, in consideration of the sufficient reduction of a friction resistance.

When performing a curing reaction with the polymer composition, a polymerization initiator may further be added. Here, various types of the polymerization initiator may be used. For example, a thermal polymerization initiator or an optical polymerization initiator may be used. In addition, in a case where a curing reaction with the polymer composition is possibly performed without requiring the addition of the polymerization initiator, the polymerization initiator may not be used. For example, such a curing reaction with the polymer composition may be performed by radiation of actinic rays. Radicals produced by heat or actinic rays may contribute to polymerization of the polymer composition, which may result in the formation of the cross-linked structure by intermolecular and intramolecular cross-linking reaction, thereby obtaining a cured polymer composition. As actinic rays used herein, ultraviolet (UV) radiation or electron beams may be used. As a radiation apparatus used herein, a UV radiation or electron beam apparatus known in the art may be appropriately used.

Since the multifunctional spherical dendrimer, the first multifunctional acryl compound, and the second multifunctional acryl compound may adversely affect solubility of the charge generation material and the binder polymer that are included in the photosensitive layer positioned below the protection layer 5, the multifunctional spherical dendrimer, the first multifunctional acryl compound, and the second multifunctional acryl compound may be soluble in, although not limited thereto, an alcohol solvent, such as ISO propanol. For example, if the multifunctional spherical dendrimer, the first multifunctional acryl compound, and the second multifunctional acryl compound have no effect on the solubility of the layers positioned below the protection layer 5, the alcohol solvent may be used in combination with a polymer-soluble organic solvent. Alternatively, a compound that is not soluble in the alcohol solvent may be also used.

The metal oxide particle includes metal oxide. An example of the electrically conductive metal oxide includes a monomeric metal oxide, such as tin oxide, titanium oxide, indium oxide, zinc oxide, and antimony oxide, or a solid solution of tin oxide and antimony oxide. In addition, a phosphorus- or antimony-containing metal oxide, such as phosphorus-containing tin oxide and antimony-containing tin oxide, may be used. A mixing amount of the metal oxide particles is not particularly limited, but for example, may be about 10 parts by mass or greater, e.g., about 15 parts by mass or greater, and about 40 parts by mass or less, e.g., about 25 parts by mass or less, based on 100 parts by mass of the polymer composition. While not wishing to be bound by a theory, it is understood that when metal oxide particles are mixed within the ranges above, reduction in charging performance or image defects such as dark spots may not occur while good sensitivity characteristics may be obtained.

As the metal oxide particle used herein, a microscopic metal oxide particle may be used. For example, the metal oxide particle may have an average primary particle diameter of about 5 nanometers (nm) or greater and about 300 nm or less, e.g., about 100 nm or less. The average primary particle diameter may be calculated from the observation and image analysis using a scanning electron microscope. While not wishing to be bound by theory, it is understood that when the metal oxide particle has the average primary particle diameter within the ranges above, reduction in a resistance against abrasion and deterioration in image quality may not occur. In this regard, linear scratches having a large width may not be caused on the surface of the OPC 1.

The metal oxide particle may have an aspect ratio of, for example, 3 or more. The metal oxide particle having the aspect ratio of 3 or more may be prepared in the form of a needle. While not wishing to be bound by theory, it is understood that when the metal oxide particle has a too large aspect ratio, reduction in dispersibility or deterioration in the coating process may occur. Thus, the metal oxide particle may have the aspect ratio of, for example, 50 or less.

The metal oxide of the metal oxide particle may be further surface-treated with a silane coupling agent. As a result, the metal oxide particle may further include a silane coupling agent disposed on a surface thereof.

Figure 3:
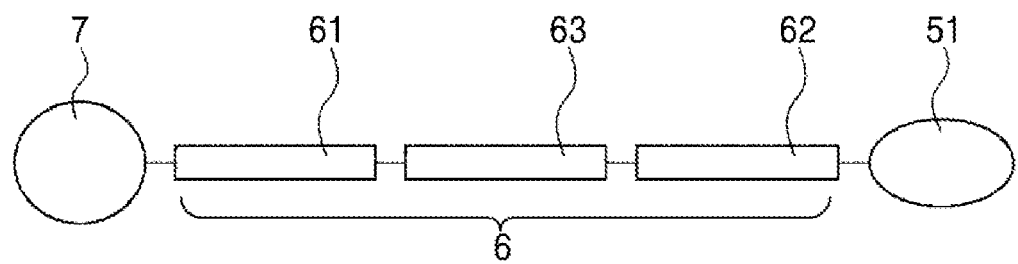
FIG. 3 illustrates a schematic structure of a silane coupling agent according to an exemplary embodiment.

FIG. 3 illustrates a schematic structure of a silane coupling agent 6 according to an exemplary embodiment. The silane coupling agent 6 includes a silane coupling part 61, a photoreactive part 62, and a lubricious part 63. The silane coupling part 61 may be coupled with a metal oxide 7 while the photoreactive part 62 may be combined with a curable polymer 51. In further detail, the silane coupling agent 6 may be a grafted aggregate including on a side chain the silane coupling part 61 coupled with the metal oxide 7, the photoreactive part 62, and the lubricious part 63 including at least one of fluorine or silicon.

The grafted aggregate may have an acryl, epoxy, or oxetane main chain. The acryl main chain may have a skeleton structure in which an acryloyl group or a methacryloyl group is polymerized with one another. The epoxy main chain may have a skeleton structure in which an epoxy group is polymerized one another. In an exemplary embodiment, the polymer composition of the OPC 1 may be derived from acryl compounds, which may result in an increased reaction speed during the formation of the main chain. In this regard, it is preferable to have the acryl main chain in the grafted aggregate may have, but is not limited thereto.

The silane coupling part may include a part represented by Formula 3:

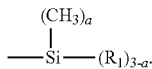

Formula 3

In Formula 3, $R_1$ may be an alkoxy group, a may be an integer from 0 to 2.

The alkoxy group may consist of, for example, 1 to 5 carbon atoms, and examples of the alkoxy group include a methoxy group and an ethoxy group.

Figure 4:
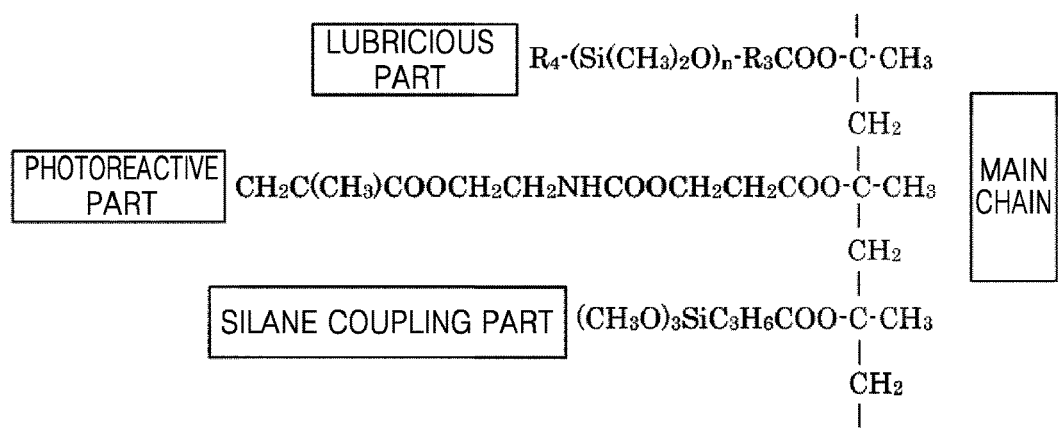
FIG. 4 illustrates a molecular structure of a silicon silane coupling agent according to an exemplary embodiment.
Figure 5:
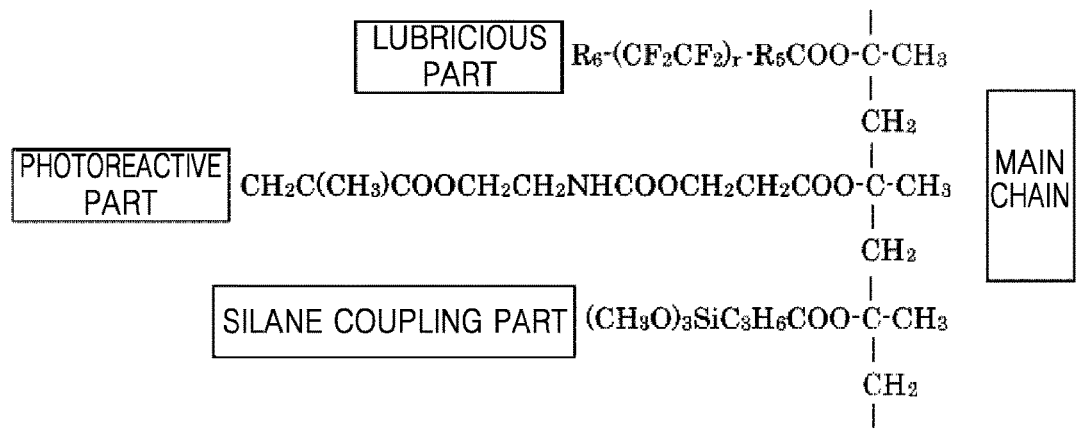
FIG. 5 illustrates a molecular structure of a fluorine silane coupling agent according to an exemplary embodiment.

For example, in Formula 3, $R_1$ may be a methoxy group, and a may be 0. The silane coupling part 61 including a trimethoxy silyl group may be easily coupled with the metal oxide 7. The group represented by Formula 3 may be easily bonded to the acryl main chain via the alkyl group, wherein the alkyl group may consist of 1 to 5 carbon atoms. FIGS. 4 and 5 each illustrate a molecular structure of a propyl group as the alkyl group according to an exemplary embodiment, the propyl group having —C(=O)O— as a main chain and being positioned between a trimethoxy group and a silyl group.

The photoreactive part 63 may have a photoreactive functional group, and for example, may include a part represented by Formula 4:

—COO—NH—$R_2$—Y.    Formula 4

In Formula 4, $R_2$ may be an alkyl group, and

Y may be a photoreactive functional group.

The alkyl group of $R_2$ may consist of, for example, 1 to 5 carbon atoms, and an example of the alkoxy group includes an ethyl group. The group represented by Formula 4 may be easily bonded to the acryl main chain via the alkyl group, wherein the alkyl group may consist of 1 to 5 carbon atoms. FIGS. 4 and 5 each illustrate a molecular structure of an ethyl group as the alkyl group according to an exemplary embodiment the ethyl group having —C(=O)O— as a main chain and being positioned between —C(=O)O— and its neighboring NH group.

The photoreactive functional group may include an acryl, epoxy, or oxetane functional group. In an exemplary embodiment, the polymer composition of the OPC 1 may be derived from acryl compounds. In this regard, it is preferable to use the acryl photoreactive functional group, but is not limited thereto. In this combination of the photoreactive functional group, the photoreactive functional group may be easily cross-linked with the polymer composition. Examples of the acryl photoreactive functional group include acryloyl ($CH_2$=CHCOO—) and methacryloyl ($CH_2$=C($CH_3$)COO—).

The lubricious part 63 may include at least one of silicon or fluorine.

When the lubricious part 63 includes silicon, the lubricious part 63 may include a part represented by Formula 5:

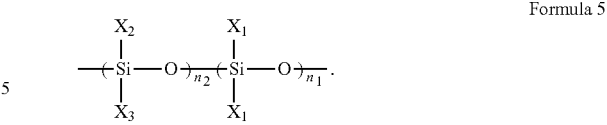

Formula 5

In Formula 5, $X_1$ may be an alkyl group, $X_2$ and $X_3$ may each be an alkyl group or an aryl group, and $n_1$ and $n_2$ may each be an integer from 1 to 500, e.g., from 1 to 300, and from 10 to 200.

The alkyl group of $X_1$ may consist of, for example, 1 to 3 carbon atoms. The alkyl group of each of $X_2$ and $X_3$ may consist of, for example, 1 to 3 carbon atoms, and the aryl group of each of $X_2$ and $X_3$ may include a phenyl group or a benzyl group. In terms of excellent lubricity, all of $X_1$, $X_2$, and $X_3$ may each be a methyl group; $X_1$ may be a methyl group while $X_2$ and $X_3$ may each be a phenyl group; or $X_1$ and $X_2$ may each be a methyl group while $X_3$ may be a phenyl group. Such $X_1$, $X_2$, and $X_3$ may not adversely affect electrical properties of the OPC 1. In a case where all of $X_1$, $X_2$, and $X_3$ are each a methyl group, the lubricious part 63 may be a dimethyl silicon type. In a case where $X_1$ is a methyl group while $X_2$ and $X_3$ are each a phenyl group, or in a case where $X_1$ and $X_2$ are each a methyl group while $X_3$ is a phenyl group, the lubricious part 63 may be a methyl-phenyl silicon type.

The part represented by Formula 5 may be easily bonded to the acryl main chain via the alkyl group, wherein the alkyl group may be denoted as $R_3$ of FIG. 4 and may consist of 1 to 5 carbon atoms. In addition, as a terminal group of the silicon-containing lubricious part 63, a methyl group or a tert-butyl group may be used. The terminal group of the silicon-containing lubricious part 63 may be denoted as $R_4$ of FIG. 4.

When the lubricious part 63 includes fluorine, the lubricious part 63 may include a part represented by Formula 6:

Formula 6

In Formula 6, m may be an integer from 1 to 400, e.g., from 1 to 100 and from 1 to 20.

The inclusion of the part represented by Formula 6 in the lubricious part 63 may not adversely affect electrical properties of the OPC 1. When the lubricious part 63 includes a repeating unit of —$CF_2$—$CF_2$—, the lubricious part 63 may be a polytetrafluoroethylene (PTFE) type. The group represented by Formula 6 may be easily bonded to the acryl main chain via the alkyl group, wherein the alkyl group may be denoted as $R_5$ of FIG. 5 and may consist of 1 to 5 carbon atoms. In addition, as a terminal group of the fluorine-containing lubricious part 63, F— (fluoro) or H— may be used. The terminal group of the fluorine-containing lubricious part 63 may be denoted as $R_6$ of FIG. 5. In addition to the described provided in connection with the lubricious part 63, the lubricious part 63 may also have a perfluoropolyether or polychlorotrifluoroethylene structure.

The silane coupling agent 6 may have a weight average molecular weight Mw of about 300 Da or greater, and less than about 120,000 Da. For example, the silane coupling agent 6 may have a weight average molecular weight Mw in a range between about 300 Da to about 100,000 Da, e.g., between about 5,000 Da to about 20,000 Da. While not wishing to be bound by theory, it is understood that when the silane coupling agent 6 has the weight average molecular weight Mw within the ranges above, the silane coupling agent 6 may exhibit excellent lubricity effects.

The silane coupling agent 6 may have polydispersity of, for example, 1 to 5.

FIG. 4 illustrates a molecular structure of the silane coupling agent 6 including silicon in the lubricious part 63 according to an exemplary embodiment, and FIG. 5 illustrates a molecular structure of the silane coupling agent 6 including fluorine in the lubricious part 63 according to an exemplary embodiment. The silane coupling agent 6 of FIG. 4 may be a grafted aggregate including the acryl main chain and side chains formed by which the dimethyl silicon type lubricious part 63, the photoreactive part 62 including the acryl photoreactive functional group, and the silane coupling part 61 including the trimethoxy silyl group each extend from the acryl main chain. In FIG. 4, n refers to a sum of $n_1$ and $n_2$. The silane coupling agent 6 of FIG. 5 may be a grafted aggregate including the acryl main chain and side chains formed by which the PTFE type lubricious part 63, the photoreactive part 62 including the acryl photoreactive functional group, and the silane coupling part 61 including the trimethoxy silyl group each extend from the acryl main chain. In FIG. 5, r refers to an integer from 1 to 200. In addition, in FIGS. 4 and 5, the silane coupling part 61, the photoreactive part 62, and the lubricious part 63 are provided in the order, but the order of the parts is not limited thereto. The silane coupling part 61, the photoreactive part 62, and the lubricious part 63 may be provided in a different order or in a random order. In addition, each of the silane coupling part 61, the photoreactive part 62, and the lubricious part 63 may be also provided in a successive manner.

The silane coupling agent 6 may have the photoreactive part to be cross-linked with a photo-curable polymer, as in the case of the lubricious part 63. In this regard, the silane coupling agent 6 may be uniformly dispersed in the protection layer 5 without undue difficulty, and furthermore, may not be easily subjected to segregation. Thus, even if the surface of the OPC 1 is peeled, the lubricity thereof may be continued to maintain, thereby maintaining cleaning properties thereof. In addition, due to the cross-linking reaction with the polymer composition, the mechanical intensity of the OPC 1 may be also continued to maintain. In addition, due to the inclusion of the photoreactive part 62 or the silane coupling part 61 in the side chains, a number of each of the silane coupling part 61, the photoreactive part 62, and the lubricious part 63 may increase per 1 molecule. In addition, the inclusion of the photoreactive part 62 or the silane coupling part 61 in the side chains may facilitate a strong cross-linking reaction with the photo-curable polymer, or may result in a strong coupling reaction by the metal oxide.

Hereinafter, a method of preparing the silane coupling agent 6 according to an exemplary embodiment and a method of performing surface-treatment on a surface of the metal oxide according to an exemplary embodiment will be described by referring to FIG. 6

First, a surface-treating agent to perform surface treatment on a surface of the metal oxide particle is prepared. That is, acrylate or methacrylate each having the silane coupling part, isocyanate having the photoreactive part, acrylate or methacrylate each having functional group that can be linked with the urethane bond, acrylate or methacrylate each having the lubricious part, and if necessary, the polymerization initiator may be polymerized in the presence of a solvent under an inert gas atmosphere (First polymerization reaction in FIG. 6). Afterwards, an isocyanate having the photoreactive part is further added thereto to allow a polymerization reaction in the present of a catalyst (Second polymerization reaction in FIG. 6). Consequently, a surface-treating agent having a silane coupling agent with an acryl main chain may be obtained. The first polymerization reaction may be performed at a temperature in a range between about 40° C. and about 120° C. for about 1 hour to about 12 hours.

Examples of the acrylate or methacrylate each having the silane coupling part include 3-methacryloxypropyltrimethoxysilane, 3-methacryloxypropyldiethoxysilane, and 3-acryloxypropyltrimethoxysilane. Examples of the isocyanate having the photoreactive part and the acrylate or methacrylate each having the functional group that can be linked with the urethane bond include 2-hydroxyethyl methacrylate (HEMA), 4-hydroxybutylacrylate, and 2-hydroxypropyl methacrylate. In the case of including silicon in the lubricious part, an example of the acrylate or methacrylate each having the lubricious part include acryl-modified or methacryl-modified reactive silicone oil. In the case of including fluorine in the lubricious part, an example of the acrylate or methacrylate each having the lubricious part include, octafluoropentyl acrylate or 2,2,2-trifluoroethyl acrylate represented by Formula 7:

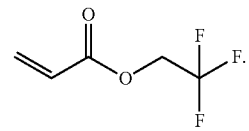

Formula 7

The reaction initiator may be, for example, a thermal initiator or a photoinitiator such as a free radical photoinitiator and/or an ionic photoinitiator. A thermal initiator can be an azo compound such as 4,4-azobis(4-cyanovaleric acid), 1,1'-azobis(cyclohexanecarbonitrile), or 2,2'-azobisisobutyronitrile (AIBN); an inorganic peroxide such as ammonium persulfate, hydroxymethanesulfinic acid monosodium salt dehydrate, and sodium or potassium persulfate; and an organic peroxide such as benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, and peracetic acid, but is not limited thereto. A photoinitiator can be benzoin and its derivatives such as benzoin ethyl ether, benzoin isobutyl ether, or benzoin methyl ether; a benzyl ketal; acetophenone and its derivatives such as 2,2-diethoxyacetophenone, 2,2-dimethoxy-2-phenylacetophenone, 4'-ethoxyacetophenone, 3'-hydroxyacetophenone, 4'-hydroxyacetophenone; benzophenone and its derivatives such as 3-hydroxybenzophenone, 4-hydroxybenzophenone, 4'-phenoxyacetophenone; an acylphosphine oxide, such as diphenyl(2,4,6-trimethylbenzoyl)phosphine oxide, but are not limited thereto. Examples of the polymerization initiator include azobisisobutyronitrile (AIBN), 2,2'-azobis-2-methylbutyronitrile (AMBN), and 2,2'-azobis-2,4-dimethylvaleronitrile (ADVN). The solvent may be an aprotic polar solvent. The aprotic polar solvent may include a sulfoxide-containing solvent such as dimethylsulfoxide and diethylsulfoxide, a formamide-containing solvent such as N,N-dimethyl formamide and N,N-diethylformamide, an acetamide-containing solvent such as N,N-dimethylacetamide, N,N-dimethylmethoxyacetamide, and N,N-diethylacetamide, a pyrrolidone-containing solvent such as N-methyl-2-pyrrolidone, N-acetyl-2-pyrrolidone, and N-vinyl-2-pyrrolidone, a phenol-containing solvent such as phenol, o-cresol, m-cresol, p-cresol, xylenol, halogenated phenol, and catechol, hexamethylphosphoramide, γ-butyrolactone, tetrahydrothiophene dioxide, N-methyl-δ-caprolactam, N,N,N',N'-tetramethylurea, or a mixture thereof. However, this disclosure is not limited to an aprotic polar solvent, and an aromatic hydrocarbon solvent such as xylene or toluene may be used. Examples of the solvent include diethylene-glycol-ethyl-methyl-ether, dimethyl sulfoxide (DMSO), and toluene. Examples of the isocyanate having the photoreactive part include 2-isocyanatoethyl methacrylate, 2-isocyanatoethyl acrylate. Examples of the catalyst include dibutyltin dilaurate, dibutyltin diacetate, and triphenylphosphine.

The obtained surface-treating agent and the metal oxide particles may be dispersed in a dispersion solvent by using a sand-mill, so as to obtain a solution containing a surface-treated metal oxide. Examples of the dispersion solution include methanol, n-propanol, and a combination thereof. The obtained solution containing the surface-treated metal oxide may be used in combination with the photo-curable polymer as a starting substance and other materials including the polymerization initiator and the solvent, so as to form a protection layer coating solution. Here, the polymerization initiator may be an α-aminoalkyl phenone, α-hydroxyalkyl phenone, or oxime ester radical photo-polymerization initiator, and the solvent may be the same with the dispersion solvent described above.

Figure 6:
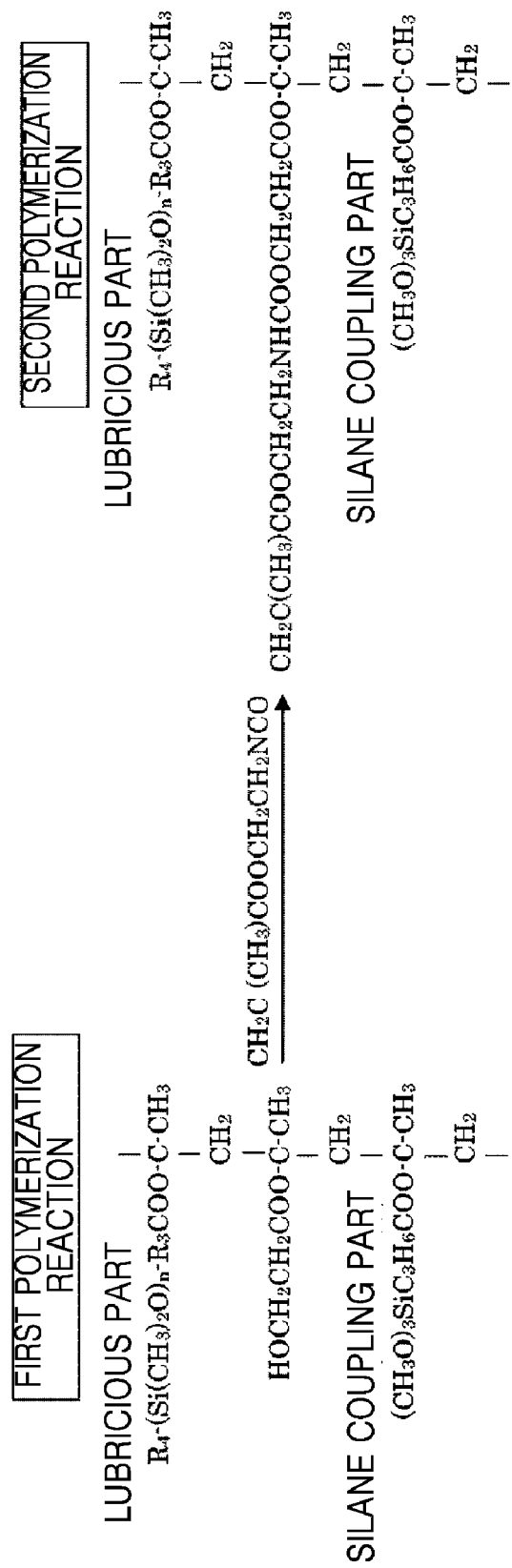
FIG. 6 illustrates polymerization reaction steps for preparing the silicon silane coupling agent of FIG. 4 according to an exemplary embodiment.

FIG. 6 illustrates polymerization reaction steps using the following materials: 3-methacryloxypropyltrimethoxysilane as the methacrylate having the silane coupling part; HEMA as the isocyanate having the photoreactive part and the methacrylate having the functional group that can be linked with the urethane bond; methacryl-modified single-ended reactive silicone oil as the methacrylate having the lubricious part; and 2-isocyanatoethyl methacrylate as the isocyanate having the photoreactive part. In the second polymerization reaction, a hydroxyl group of the HEMA and an isocyanate group of the isocyanate form a urethane bond.

In addition, a method of preparing the silane coupling agent having the acryl main chain has been described above. However, the silane coupling agent having the epoxy main chain may be prepared, for example, by ring-opening polymerization of an epoxy group using a reactive epoxy group with respect to starting materials each including the silane coupling part, the photoreactive part, and the lubricious part.

The protection layer 5 may further include a charge transporting material, and accordingly, reduction in a residual potential or sensitivity deterioration may be suppressed. As the charge transporting material used in the protection layer 5, all the charge transporting materials described in connection with the charge transport layer may be used.

The protection layer 5 may have a thickness in a range between about 0.1 μm and about 10 μm, and for example, between about 1 μm and about 7 μm.

A method for forming the protection layer 5 is not particularly limited, but for example, the protection layer 5 may be formed as follows. First, a non-reactive polymer composition and a plurality of metal oxide particles may be dissolved or dispersed in a solvent, so as to prepare a composition for forming the protection layer 5. Then, the composition for forming the protection layer 5 may be coated on the photosensitive layer. Following the removal of the solvent and the performance of polymerization, the protection layer 5 may be formed. The composition for forming the protection layer 5 may be utilized according to any coating method, such as a dip coating method, a ring coating method, a roll coating method, a wire-winding load coating method, or a spray coating method. The solvent used herein may be selected according to components of the polymer composition. However, in terms of the capability of reducing damages on the photosensitive layer, an alcohol solvent, such as ISO propanol, may be used. The removal of the solvent may be performed by heat treatment. Here, a temperature at which the heat treatment is performed and a time for which the heat treatment is performed may be determined according to the solvent being used. For example, the heat treatment may be performed at a temperature of about 100° C. for about 10 minutes. The heat treatment may be performed under reduced pressure. According to an exemplary embodiment regarding a curing method of the protection layer 5, the protection layer 5 may be formed by coating, drying, and exposing to actinic rays. Radicals produced therefrom may contribute to polymerization, which may result in the formation of the cross-linked structure by intermolecular and intramolecular cross-linking reaction, thereby obtaining a cured polymer composition. As actinic rays used herein, UV radiation or electron beams may be used. As a radiation apparatus used herein, a UV radiation or electron beam apparatus known in the art may be appropriately used to form the protection layer 5.

Intermediate Layer

An intermediate layer may be further provided between the electrically conductive support and the charge generation layer. The intermediate layer may be provided for the purpose of preventing charge injection from the electrically conductive support, improving adhesion, preventing moisture or the like, improving coating properties of the photosensitive layer, and reducing a residual voltage.

The intermediate layer may be mainly formed of a binder polymer, and in an exemplary embodiment, may include a metal or alloy, an oxide of the metal or alloy, a salt, and a surfactant.

The intermediate layer may be formed as follows: fine powders may be prepared first by using a thermosetting polymer and an inorganic pigment, such as metal oxide including titanium oxide, silica, alumina, zirconium oxide, tin oxide, or indium oxide, metal sulfide, or metal nitride; and at least one or two types of the find powders may be used in combination with a coating solution prepared by dispersion using a ball-mill, a sand-mill, or an attritor, so as to form the intermediate layer.

As the inorganic pigment used herein, titanium oxide having high purity may be used. As the solvent used for dissolving the inorganic pigment, a ketone solvent, such as cyclohexanone, methylethylketone, or methylisobutylketone, may be used in terms of the solubility of the polymer and the dispersion of the inorganic pigment. When the solvent described above is used, the inorganic pigment may be dispersed at a primary particle diameter so that the coating solution having uniformity without aggregation may be prepared.

As the polymer used in the intermediate layer, a polymer having a high resistance of solubility with respect to a typical organic solvent may be used in consideration of using a solvent to coat the intermediate layer with the photosensitive layer. In this regard, the polymer may be a thermosetting polymer, such as an acryl polymer, an alkyd polymer, an amino polymer, or a melamine polymer. Examples of the polymer include polyester, polyurethane, polyarylate, polyethylene, polystyrene, polybutadiene, polycarbonate, polyamide, polypropylene, polyimide, phenolic polymer, acrylic polymer, silicon polymer, epoxy polymer, urea polymer, ary polymer, alkyd polymer, polyamide-imide, polysulfone, polyaryl ether, polyacetal, and butyral polymer.

Electrophotographic Photoconductor

The OPC 1 according to an exemplary embodiment may be used as an electrophotographic photoconductor. The electrophotographic photoconductor may be, for example, in the form of a drum, and may be driven to rotate on an axis with a predetermined peripheral velocity. During the rotation process, circumferential surfaces of the electrophotographic photoconductor may be uniformly charged with positive or negative potential by charging means. A voltage applied thereto may be, for example, a vibration voltage obtained by superimposing an alternating voltage on a direct current voltage. As the charging apparatus, a contact charging apparatus that provides an electric charge by contacting a charging member with the photoconductor may be used. Following the charging with electricity, the electrophotographic photoconductor may be exposed by exposing means, such as slit exposure or laser-beam injection exposure. In this regard, an electrostatic latent image may be formed in sequence on circumferential surfaces of the electrophotographic photoconductor. Then, the formed electrostatic latent image may be developed by developing means to form a toner image, which may be accordingly transferred to a provided transfer sheet.

Electrophotographic Device

According to an exemplary embodiment, there is provided an electrophotographic device equipped with charging means for charging the electrophotographic photoconductor and circumferential surfaces of the electrophotographic photoconductor with electricity, image exposure means, developing means, and cleaning means. Hereinafter, the electrophotographic device according to an exemplary embodiment will be described by referring to FIG. 7.

Figure 7:
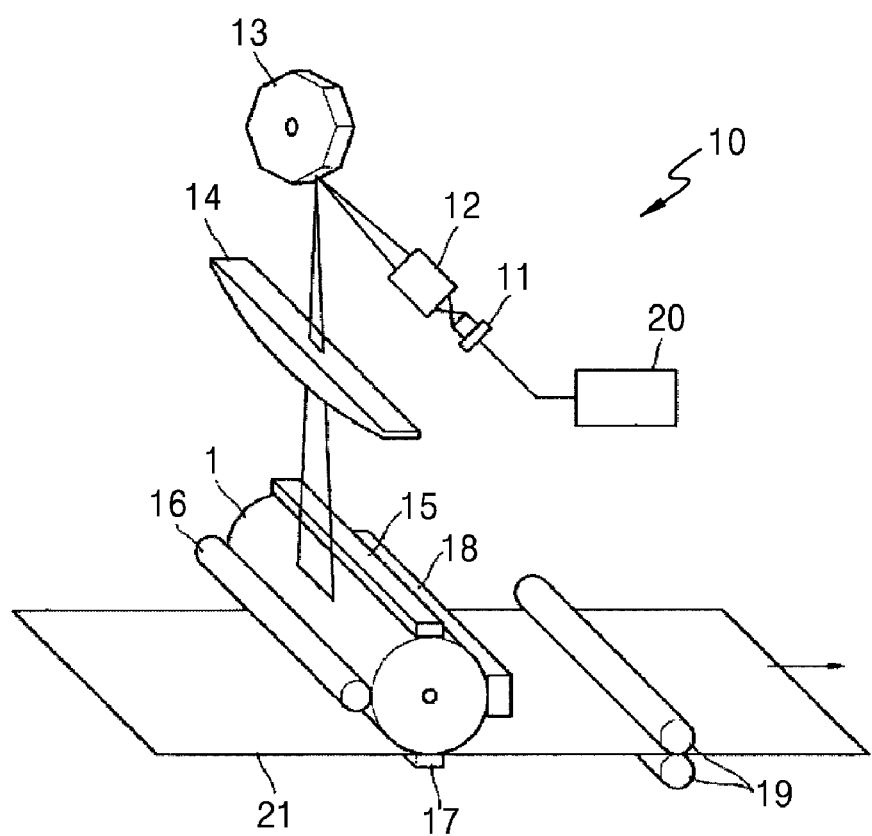
FIG. 7 illustrates a schematic view of an electrophotographic apparatus according to an exemplary embodiment.

FIG. 7 is illustrates a schematic view of an electrophotographic device 10 according to an exemplary embodiment. The electrophotographic device 10 includes, as image exposure means, a semiconductor laser 11. Laser light that is signal-modulated by a control circuit 11 according to image information is collimated by an optical correction system 12 after being radiated and performs scanning while being reflected by a polygonal rotator mirror 13. The laser light is focused on a surface of an electrophotographic photoconductor 1 by a f–θ lens 14, and exposes the surface according to the image information. Since the electrophotographic photoconductor 1 is may be already charged by a with electricity beforehand by a charging device 15 which serves as the charge means, and accordingly, an electrostatic latent image is formed on a surface of the electrophotographic photoconductor 1 upon the exposure of image information. Afterwards, the electrostatic latent image formed on the electrophotographic photoconductor 1 by using a developing device 16 which serves as the developing means is then developed by using a toner, thereby forming a toner image that is then visualized. The visible image is transferred to an image receptor 21, such as a paper sheet, by a transferring apparatus, and is fixed in fixing apparatus 19 to be provided as a print result. The electrophotographic photoconductor 1 may be used repeatedly by removing a toner or a toner substance that remains on the surface thereof by a cleaning apparatus 18 which serves as cleaning means.

The electrophotographic photoconductor 1 of FIG. 7 illustrated in the form of a drum may be driven to rotate on an axis with a predetermined peripheral velocity. During the rotation process, circumferential surfaces of the electrophotographic photoconductor may be uniformly charged with positive or negative potential by charging means. A voltage applied thereto may be, for example, a vibration voltage obtained by superimposing an alternating voltage on a direct current voltage. The electrophotographic photoconductor drum is provided herein, but the electrophotographic photoconductor may be also in the form of a sheet or a belt.

As the charging apparatus 15, a contact charging apparatus that provides an electric charge by contacting a charging member, such as a charging roller or a charging brush, with the photoconductor may be used. In addition to the charging device 15 of FIG. 7, a scorotron charger or a corotron charger, which is a non-contact charging device using a charging roller or a corona discharge, may be used.

Process Cartridge

The electrophotographic photoconductor according to an exemplary embodiment may be used as a process cartridge. For example, the electrophotographic photoconductor described above may be configured by integrally combining with a charging means and a developing means. The process cartridge may be configured to be removed from a main body of an electrophotographic device, such as a copy machine or a laser beam printer.

Hereinafter, the present inventive concept will be described in further detail with reference to the following examples. However, these examples are for illustrative purposes only and are not intended to limit the scope of the present inventive concept.

EXAMPLES

Effects of Multifunctional Dendrimers

A composition for a tensile test was prepared by mixing in a predetermined ratio a first multifunctional acryl compound including a urethane bond with a multifunctional spherical dendrimer. Then, the composition was polymerized to prepare a test sample for the tensile test. Urethane acrylate oligomer (UV-7605B, Mw: 1,100, NIPPON GOHSEI CHEMICALS) was used as the first multifunctional acryl compound, and dendrimer polyacrylate oligomer (Star-501, Mw: 18,100, OSAKA Organic Chemical Industry Ltd.) was used as the multifunctional spherical dendrimer. As a polymerization inhibitor to be included in the composition for the tensile test, 10 parts by weight of 2-methyl-1-[4-(methylthio)phenyl]-2-morpholinopropane 1-one (Irgacure 907, BASF Japanese product) were added based on 100 parts by mass of the total amount the first multifunctional acryl compound and the multifunctional spherical dendrimer, and the mixed composition was irradiated with UV light to perform cross-linking polymerization. During the UV radiation, a metal-halide lamp was used to control a radiation intensity and time. The mixed composition was cured with UV light in a dose of 1,850 milli Joules per square centimeter ($mJ/cm^2$), so as to form a film having a thickness of about 15 micrometers (μm).

The test sample was prepared in a fragment (strip) having a width of 10 millimeters (mm), a thickness of 15 μm, and a distance between chucks of 20 mm. The tensile test was performed at a tensile speed of about 0.01 millimeters per second (mm/s), so as to measure the mechanical properties of the cured film.

Test sample 1 was prepared as a cured product of the first multifunctional acryl compound without including the multifunctional spherical dendrimer. Test sample 2 was prepared as a cured product including a mixture of 50 percent by mass (mass %) of the first multifunctional acryl compound and 50 mass % of the multifunctional spherical dendrimer based on the total of 100 mass % of the multifunctional acryl compound and the spherical dendrimer. Test sample 3 was prepared as a cured product including 80 mass % of the first multifunctional acryl compound and 20 mass % of the spherical dendrimer.

TABLE 1

|  | Test sample 1 | Test sample 2 | Test sample 3 |
|---|---|---|---|
| First multifunctional acryl compound | 100% | 50% | 80% |
| Multifunctional spherical dendrimer | 0% | 50% | 20% |
| Young's modulus ($GP_a$) | 3.07 | 2.02 | 2.29 |
| Maximum elongation (%) | 0.34 | 1.88 | 1.8 |
| Breaking load (g) | 210 | 771 | 841 |

Referring to Table 1, it was confirmed that in the case of cured films prepared by forming a complex with the spherical dendrimer having a Young's modulus reduced by 25%, a maximum elongation was five times greater and a breaking load was four times greater compared to those of a cured film prepared by using only the first multifunctional acryl compound including the urethane bond (i.e., Test Sample 1). As such, the cured film including the complex with the multifunctional spherical dendrimer may relieve a pressure welding stress on the cleaning blade and a stress on the surface of the photoconductor upon cleaning of toner external additive abrasive particles. Furthermore, the cured film including the complex with the multifunctional spherical dendrimer may have improved resistance against scratches, as well as resistance against mechanical stress caused by swelling or shrinkage of the film according to temperature and humidity changes. Consequently, it was confirmed that the cured film including the complex with the multifunctional spherical dendrimer has long-term durability, and thus may serve as a protection layer of the OPC.

Effects of Ternary Components

Measurement of Coefficient of Friction

The scratch test was performed by using the plate-type cured films while the coefficient of friction thereof was also measured in a depth direction of the same plate-type cured films.

The scratch test was performed by using a UMT-2 sensor (manufactured by Bruker-axs Company) to cause a probe linear variation with a load range between 0.5 Newton (N) to 5 N by using a Rockwell indenter (200 μm tip radius with a 120° cone angle). In addition, the scratch test was performed under conditions of a measurement speed of 0.1 mm/sec, a measurement distance of 5 mm, and a measurement time of 50 seconds. A portion left with a trace of scratches on the surface of the cured film was again used to measure a coefficient of friction under conditions of a load of 0.5 N, a measurement distance of 5 mm, a measurement speed of 0.1 mm/sec, and a measurement time of 50 seconds. Then, based on the coefficient of friction measured after the completion of the scratch test and the results of measuring a depth of the trace of scratches by using a white light-interference microscope (manufactured by Bruker-axs Company, an optical profiler, measuring resolution (Z direction): 0.1 nanometers (nm)), the coefficient of friction of the film in the depth direction was calculated.

Measurement of Surface Hardness

The OPCs prepared in the following examples were subjected to measurement of surface hardness (Martens hardness (HM)) and elastic power by using a microhardness measuring apparatus. As the microhardness measuring apparatus used herein, a nanoindentation tester (type: PICODENTER HM500) of Fischer Instrument Company was used. PICODENTER HM500 was used to measure mechanical properties of cured polymer layers formed on a surface layer of the OPCs according to the load-indentation depth method (i.e., the indentation test). As an indenter, triangular diamond particles with a load of 0.5 milli Newton (mN) were used. Then, the test results were obtained by evaluating the mechanical properties of the surface layer established data of surface hardness characteristics (Martens hardness HM) and elastic and sintering characteristics (elastic power, nIT).

Image Blur

The OPCs prepared in the following examples were each installed in an electrophotographic apparatus [Samsung Co. Ltd., CLX-8650ND]. Then, an A4 image having a printing ratio of 2.5% for each color of yellow (Y), magenta (M), cyan (C), and black (Bk) was printed onto 30 million neutral paper sheets. Afterwards, a text 5% chart was printed to evaluate the presence/absence of image blur and image deletion according to the following evaluation criteria.

⊚: No occurrence of image blur afterimage

○: Minor occurrence of image blur afterimage (no problem in practical use)

x: Occurrence of image blur afterimage

Cleaning Defects

Following the image blur evaluation, a half tone (HT) image was formed at a temperature of 23° C. and a humidity of 55%. The formed HT image was evaluated with naked eyes according to the following evaluation criteria.

⊚: No image defects by cleaning defects

○: Minor image defects by cleaning defects (no problem in practical use)

x: Presence of image defects by cleaning defects

Squeal Noise of a Blade

Following the evaluation on the cleaning defects, an A4 image having a printing ratio of 2.5% for each color of Y, M, C, and Bk was printed on 30 million neutral paper sheets at a temperature of 10° C. and a humidity of 20% by using the same electrophotographic apparatus as the one used in the potential measurement. Afterwards, the squeal noise of a blade was determined according to the following evaluation criteria.

⊚: No squeal noise of the blade until the end of printing 30 million sheets

○: Minor squeal noise of the blade by a photoconductor when started up and/or stopped (no problem in practical use)

x: Subsequent squeal noise of a blade

Film Reduction

An initial film thickness of the OPC and a film thickness of the OPC after the completion of the evaluation on the squeal noise of the blade were measured by using an eddy current thickness gauge system [FISCHERSCOPE MMS manufactured by Fischer Instrument]. The difference between the film thickness of the OPC at the beginning and the film thickness of the OPC after the completion of the evaluation was divided by the number of rotations of the OPC, and the resulting value was designated as an indicator for film reduction. In Table 2, 'k cycle' refers to the number of rotations of the OPC represented in units of 1,000, and for example, '10 k cycle' indicates that the OPC rotated ten thousand times.

Example 1

An OPC including a cured surface protection layer was prepared as follows. A laminate of the electrically conductive support/intermediate layer/charge generation layer/charge transport layer was coated with protection layer coating solution 1 including the following components according to a ring coating method; the coated laminate was dried at a temperature of 100° C. for 10 minutes; and the dried laminate was subjected to UV radiation by using a metal halide lamp for controlling UV radiation intensity and time at a UV exposure amount of 1,850 mJ/cm$^2$ to allow cross-linking and curing processes, thereby preparing an OPC in which a surface protection layer having a thickness of 5.0 μm was formed. Then, a plate-type cured film was prepared to a thickness of 5 μm in the same manner as in the case using protection layer coating solution 1. A mixing amount of the plate-type cured film was on the basis of 100 parts by mass of total amounts of the multifunctional spherical dendrimer, the first multifunctional acryl compound, and the second multifunctional acryl compound.

Protection layer coating solution 1 comprising:
first acryl compound: 75 parts by mass of urethane acrylate oligomer (UV-7605 B, Mw: 1,100, the number of functional groups: 6, NIPPON GOHSEI CHEMICALS);
spherical dendrimer: 20 parts by mass of dendrimer polyacrylate polymer (Star-501, Mw: 18,100, OSAKA Organic Chemical Industry Ltd., solid resin: 50 mass %, solvent: resin solution containing 50 mass % of propylene glycol monomethyl ether acetate);
second multifunctional acryl compound: 5 parts by mass of silicone modified acrylate containing perfluoro polyether (AF-300, NIPPON GOHSEI CHEMICALS);
electrically conductive metal oxide: 20 parts by mass of antimony tin oxide particles (ATO, product name: T-1, average particle diameter of 0.02 μm, Mitsubishi Materials Co. Ltd., 20 mass % solid/IPA dispersion);
polymerization inhibitor: (2-methyl-1-[4-(methylthio) phenyl]-2-morpholinopropane 1-one (Irgacure 907, BASF Japanese product)), 10 parts by mass; and
−2-propanol: 250 parts by mass Example 2

An OPC and a cured film were prepared in the same manner as in Example 1, except that a protection layer coating solution 2 was prepared by applying the following changes to the protection layer coating solution 1. Regarding the protection layer coating solution 2, substances that are not described herein were the same as those used for forming the protection layer coating solution 1.

Protection layer coating solution 2 comprising:
first acryl compound: 70 parts by mass of urethane acrylate oligomer (UV-7605 B, Mw: 1,100, the number of functional groups: 6, NIPPON GOHSEI CHEMICALS); and
second multifunctional acryl compound: 10 parts by mass of silicone modified acrylate containing perfluoro polyether (AF-300, NIPPON GOHSEI CHEMICALS).

Example 3

An OPC and a cured film were prepared in the same manner as in Example 1, except that a protection layer coating solution 3 was prepared by applying the following changes to the protection layer coating solution 1. Regarding the protection layer coating solution 3, substances that are not described herein were the same as those used for forming the protection layer coating solution 1.

Protection layer coating solution 3 comprising:
first acryl compound: 55 parts by mass of urethane acrylate oligomer (UV-7605 B, Mw: 1,100, the number of functional groups: 6, NIPPON GOHSEI CHEMICALS); and
second multifunctional acryl compound: 25 parts by mass of silicone modified acrylate containing perfluoro polyether (AF-300, NIPPON GOHSEI CHEMICALS).

Example 4

An OPC was prepared in the same manner as in Example 1, except that a protection layer coating solution 4 was prepared by applying the following changes to the protection layer coating solution 1. Regarding the protection layer coating solution 4, substances that are not described herein were the same as those used for forming protection layer coating solution 1.

Protection layer coating solution 4 comprising:
first acryl compound: 30 parts by mass of urethane acrylate oligomer (UV-7605 B, Mw: 1,100, the number of functional groups: 6, NIPPON GOHSEI CHEMICALS); and
second multifunctional acryl compound: 50 parts by mass of silicone modified acrylate containing perfluoro polyether (AF-300, NIPPON GOHSEI CHEMICALS).

Example 5

An OPC was prepared in the same manner as in Example 1, except that protection layer coating solution 5 was prepared by applying the following changes to protection layer coating solution 1. In protection layer coating solution 5, substances that were not described herein were the same as those used for forming protection layer coating solution 1.

protection layer coating solution 5, comprising:
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Example 6

An OPC was prepared in the same manner as in Example 1, except that a protection layer coating solution 6 was prepared by applying the following changes to the protection layer coating solution 1. Regarding the protection layer coating solution 6, substances that are not described herein were the same as those used for forming the protection layer coating solution 1.

Protection layer coating solution 6 comprising:
electrically conductive metal oxide: 10 parts by mass of phosphorus-containing tin oxide particles (PTO, product name: SP-2, average particle diameter of 0.02 μm, Mitsubishi Materials Co. Ltd., 20 mass % solid/IPA dispersion).

Example 7

An OPC was prepared in the same manner as in Example 1, except that a protection layer coating solution 7 was prepared by applying the following changes to the protection layer coating solution 1. Regarding the protection layer coating solution 7, substances that are not described herein were the same as those used for forming protection layer coating solution 1.

Protection layer coating solution 7 comprising:
electrically conductive metal oxide: 40 parts by mass of phosphorus-containing tin oxide particles (PTO, product name: SP-2, average particle diameter of 0.02 μm, Mitsubishi Materials Co. Ltd., 20 mass % solid/IPA dispersion).

Example 8

An OPC was prepared in the same manner as in Example 1, except that a protection layer coating solution 8 was prepared by applying the following changes to the protection layer coating solution 1. Regarding the protection layer coating solution 8, substances that are not described herein were the same as those used for forming protection layer coating solution 1.

Protection layer coating solution 8 comprising:
first acryl compound: 80 parts by mass of urethane acrylate oligomer (UV-7605 B, Mw: 1,100, the number of functional groups: 6, NIPPON GOHSEI CHEMICALS);
spherical dendrimer: dendrimer polyacrylate polymer (Star-501, Mw: 18,100, OSAKA Organic Chemical Industry Ltd., solid resin: 50 mass %, solvent: resin solution containing 50 mass % of propylene glycol monomethyl ether acetate);
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Example 9

An OPC was prepared in the same manner as in Example 1, except that a protection layer coating solution 9 was prepared by applying the following changes to the protection layer coating solution 1. Regarding the protection layer coating solution 9, substances that are not described herein were the same as those used for forming the protection layer coating solution 1.

Protection layer coating solution 9 comprising:
first acryl compound: 40 parts by mass of urethane acrylate oligomer (UV-7605 B, Mw: 1,100, the number of functional groups: 6, NIPPON GOHSEI CHEMICALS);
spherical dendrimer: 50 parts by mass of dendrimer polyacrylate polymer (Star-501, Mw: 18,100, OSAKA Organic Chemical Industry Ltd., solid resin: 50 mass %, solvent: 50 mass % solution containing propylene glycol monomethyl ether acetate);
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Example 10

An OPC was prepared in the same manner as in Example 1, except that a protection layer coating solution 10 was prepared by applying the following changes to the protection layer coating solution 1. Regarding the protection layer coating solution 10, substances that are not described herein were the same as those used for forming the protection layer coating solution 1.

Protection layer coating solution 10 comprising:
first acryl compound: 70 parts by mass of urethane acrylate oligomer (UV-7605 B, Mw: 1,100, the number of functional groups: 6, NIPPON GOHSEI CHEMICALS);
spherical dendrimer: 20 parts by mass of dendrimer polyacrylate polymer oligomer (Viscoat#1000, Mw: 1,570, OSAKA Organic Chemical Industry Ltd.);
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Example 11

An OPC was prepared in the same manner as in Example 1, except that a protection layer coating solution 11 was prepared by applying the following changes to the protection layer coating solution 1. Regarding the protection layer coating solution 11, substances that are not described herein were the same as those used for forming the protection layer coating solution 1.

Protection layer coating solution 11 comprising:
first acryl compound: 70 parts by mass of urethane acrylate oligomer (UV-7650 B, Mw: 2,300, the number of functional groups: 4-5, NIPPON GOHSEI CHEMICALS);
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Comparative Example 1

An OPC and a cured film were prepared in the same manner as in Example 1, except that a protection layer coating solution 12 was prepared by applying the following changes to the protection layer coating solution 1. Regarding the protection layer coating solution 12, substances that are not described herein were the same as those used for forming the protection layer coating solution 1.

Protection layer coating solution 12 comprising:
first acryl compound: 80 parts by mass of urethane acrylate oligomer (UV-7605 B, Mw: 1,100, the number of functional groups: 6, NIPPON GOHSEI CHEMICALS);
second multifunctional acryl compound: not used; and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Comparative Example 2

An OPC and a cured film were prepared in the same manner as in Example 1, except that a protection layer coating solution 13 was prepared by applying the following changes to the protection layer coating solution 1. Regarding the protection layer coating solution 13, substances that are not described herein were the same as those used for forming the protection layer coating solution 1.

Protection layer coating solution 13 comprising:
first acryl compound: 80 parts by mass of urethane acrylate oligomer (UV-7605 B, Mw: 1,100, the number of functional groups: 6, NIPPON GOHSEI CHEMICALS);
second multifunctional acryl compound: 0.5 mass % of surface modifier (silicone modified acryl polymer (GL-02 R, Mw: 7,500, Kyoeisha Chemical, content: solid 20 mass %, 80 mass % of butyl acetate); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Comparative Example 3

An OPC was prepared in the same manner as in Example 1, except that a protection layer coating solution 14 was prepared by applying the following changes to the protection layer coating solution 1. Regarding the protection layer coating solution 14, substances that are not described herein were the same as those used for forming the protection layer coating solution 1.

Protection layer coating solution 14 comprising:
first acryl compound: 90 parts by mass of urethane acrylate oligomer (UV-7605 B, Mw: 1,100, the number of functional groups: 6, NIPPON GOHSEI CHEMICALS);
spherical dendrimer: not used; and
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Comparative Example 4

An OPC was prepared in the same manner as in Example 1, except that a protection layer coating solution 15 was prepared by applying the following changes to the protection layer coating solution 1. Regarding the protection layer coating solution 15, substances that are not described herein were the same as those used for forming protection layer coating solution 1.

Protection layer coating solution 15 comprising:
first acryl compound: 70 parts by mass of acrylate monomer (SR355, Mw: 482, acryl, the number of functional groups: 4, SARTOMER Company);
second multifunctional acryl compound: 10 parts by mass of silicone modified acrylate containing perfluoro polyether (AF-300, NIPPON GOHSEI CHEMICALS); and
electrically conductive metal oxide: 20 parts by mass of phosphorus-containing tin oxide particles (PTO, product name: SP-2, average particle diameter of 0.02 μm, Mitsubishi Materials Co. Ltd., 20 mass % solid/IPA dispersion).

Figure 8:
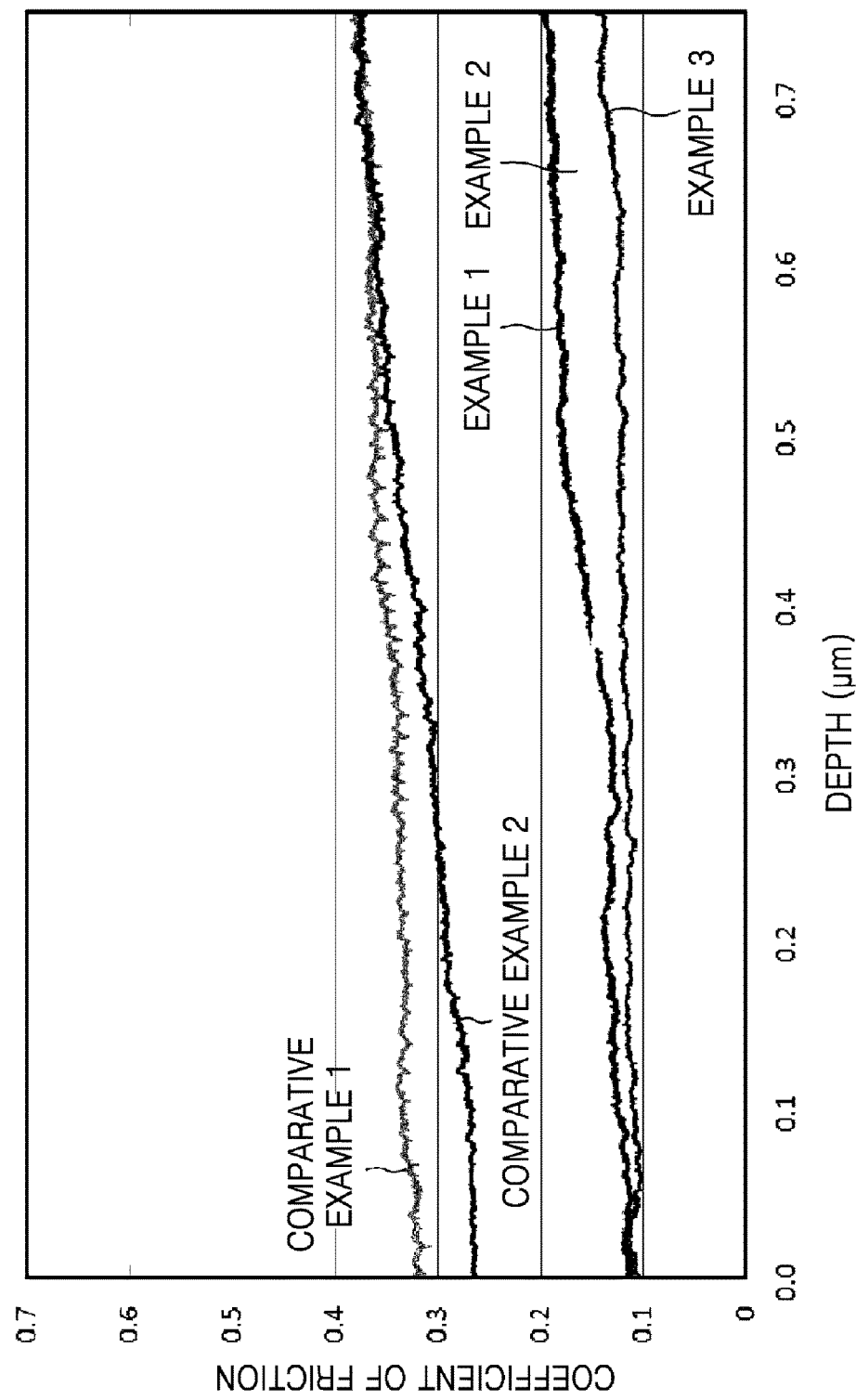
FIG. 8 illustrates a graph of a coefficient of friction versus a depth (micrometer, μm) measured from a surface of protection layers prepared according to Examples 1 to 3 and Comparative Examples 1 and 2.

FIG. 8 shows results of changes in the coefficient of friction at the time of abrasion with respect to cured films prepared according to Examples 1 to 3 and Comparative Examples 1 and 2. It was confirmed that the cured film of Comparative Example 2 to which the surface modifier was added had a slightly decreased coefficient of friction on the surface and gradually increased depths compared to those of the cured film of Comparative Example 1 to which the surface modifier was not added. The cured film of Comparative Example 2 has almost the same width as the width of the cured film of Comparative Example 1 when a depth of 0.7 μm was reached.

The coefficients of friction of the surface of the cured films of Examples 1 to 3, to which the second multifunctional acryl compound having the silicon-containing group and the fluorine-containing group was added, were significantly decreased compared to the coefficient of friction of the surface of the cured film of Comparative Example 1 to which the second multifunctional acryl compound was not added. Even when a depth of 0.7 μm was reached, the cured films of Examples 1 to 3 had a lower coefficient of friction than the coefficient of friction of the cured film of Comparative Example 1.

In addition, the OPCs of Examples 1 to 11 and Comparative Examples 1 to 4 were measured and evaluated with respect to the following properties, and the results thereof are shown in Table 2.

TABLE 2

| | Mixing amount of resins for forming surface protection layers (parts by mass) | | | Metal oxide | | Martense hardness HM (N/mm²) | Elastic power nIT (%) | Film reduction nm/k cycle | Evaluation | | |
|---|---|---|---|---|---|---|---|---|---|---|---|
| | First acryl compound | Multifunctional spherical dendrimer | Second multifunctional acryl compound | Types | Mixing amount (parts by mass) | | | | Image blur | Cleaning defects | Squeal noise of blade |
| Example 1 | 75 | 20 | 5 | ATO | 20 | 255 | 55 | 0.9 | ◎ | ◎ | ○ |
| Example 2 | 70 | 20 | 10 | ATO | 20 | 258 | 57 | 0.6 | ◎ | ◎ | ◎ |
| Example 3 | 55 | 20 | 25 | ATO | 20 | 261 | 57 | 0.6 | ◎ | ◎ | ◎ |
| Example 4 | 30 | 20 | 50 | ATO | 20 | 265 | 58 | 0.5 | ◎ | ◎ | ◎ |
| Example 5 | 70 | 20 | 10 | PTO | 20 | 257 | 56 | 0.6 | ◎ | ◎ | ◎ |
| Example 6 | 70 | 20 | 10 | PTO | 10 | 250 | 57 | 0.6 | ○ | ◎ | ◎ |
| Example 7 | 70 | 20 | 10 | PTO | 40 | 266 | 52 | 0.8 | ○ | ◎ | ○ |
| Example 8 | 80 | 10 | 10 | PTO | 20 | 237 | 54 | 0.7 | ◎ | ◎ | ◎ |
| Example 9 | 40 | 50 | 10 | PTO | 20 | 294 | 61 | 0.5 | ◎ | ◎ | ◎ |
| Example 10 | 70 | 20 | 10 | PTO | 20 | 215 | 54 | 1.1 | ◎ | ◎ | ◎ |
| Example 11 | 70 | 20 | 10 | PTO | 20 | 202 | 52 | 1.2 | ◎ | ◎ | ◎ |
| Comparative Example 1 | 80 | 20 | 0 | PTO | 20 | 245 | 56 | — | — | — | X |
| Comparative Example 2 | 80 | 20 | 0.5 | PTO | 20 | 242 | 55 | — | X | X | X |
| Comparative Example 3 | 90 | 0 | 10 | PTO | 20 | 230 | 52 | 1.4 | ○ | ○ | ◎ |
| Comparative Example 4 | 70 | 20 | 10 | PTO | 20 | 200 | 52 | 1.6 | ○ | ○ | ◎ |

The OPCs of Examples 1 to 11 showed good and satisfactory results in terms of evaluation of image blue after the printing of 30 million paper sheets, cleaning defects, and squeal noise of the blade. In addition, the OPCs of Examples 1 to 11 showed a small film reduction, indicating a good and satisfactory manner. As such, over a long period of time, these results were found to meet the required properties for the OPC. In this regard, even though the OPCs were used repeatedly for a long period of time, it was confirmed that the OPCs had less surface abrasion, maintained good cleaning ability (i.e., good scratch resistance), and had high durability (i.e., less occurrence of filming or image blur).

Evaluation of the OPC of Comparative Example 1 when printing of 30 million paper sheets failed due to the reversal of the cleaning blade during the printing process. That is, the OPC of Comparative Example 1 had a decrease in the protection layer and an increase in friction resistance, thereby failing to obtain sufficient sliding between the cleaning blade and the protection layer.

In the preparation of the photoconductor of Comparative Example 2, a sliding modifier, i.e., a polymerizable silicone-modified acrylic polymer which also serves as a surface modifier, was added to the protection layer to form the protection layer. The photoconductor of Comparative Example 2 showed sufficiently good sliding properties at the beginning of the printing, but before the completion of the printing of 30 million paper sheets, the photoconductor of Comparative Example 2 lost the good sliding properties, thereby causing problems with cleaning defects. Accordingly, it was deemed that, due to the transitional surface during the formation of the cured layer, the polymerizable silicone-modified acrylic polymer may be cured by segregation with the modifier on the surface thereof while the silicon group may be segregated on the most superficial layer of the photoconductor. Due to abrasion in time, the sliding effects were deemed to have been deleted during printing.

In this regard, it was confirmed that the photoconductor of Comparative Example 3 has not caused turnover of the cleaning blade during the printing process, but showed a greater amount of film reduction compared to the photoconductors of Examples 1 to 11 where the multifunctional spherical dendrimers were complexed with the protection layers. Accordingly, it was expected that, in spite of the contribution of the second multifunctional acryl compound to sufficient sliding properties on the surfaces in the case of the decrease of the film reduction, the photoconductor of Comparative Example 3 was not effective enough to suppress abrasion by the complexion of the spherical dendrimers with respect to stress against abrasion.

As described above, according to the one or more of the above exemplary embodiments, a time-dependent increase in a frictional resistance between a surface of an organic photoconductor and a cleaning blade is suppressed, and at the same time, the abrasion resistance of the organic photoconductor is improved.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. An organic photoconductor comprising:
   an electrically conductive substrate;
   a photosensitive layer disposed on the electrically conductive substrate; and
   a protection layer disposed on the photosensitive layer;
   wherein the protection layer comprises a polymer composition and a plurality of electrically conductive metal oxide particles, and wherein the polymer composition is a product of a curing reaction of a multifunctional spherical dendrimer, a first multifunctional acryl compound comprising a urethane bond, and a second multifunctional acryl compound comprising a silicon-containing group and a fluorine-containing group.

2. The organic photoconductor of claim 1, wherein the first multifunctional acryl compound has a weight average molecular weight of about 500 Daltons or greater and comprises tri- or higher multi-functional urethane (meth) acrylate comprising at least one of an acryloyl group, a methacryloyl group, or a vinyl group.

3. The organic photoconductor of claim 1,
wherein the multifunctional spherical dendrimer comprises at least one of polyacrylate or polyester acrylate, wherein each of the polyacrylate and polyester acrylate has a weight average molecular weight of about 1,000 Daltons or greater and about 25,000 Daltons or less, and wherein each of the polyacrylate and polyester acrylate comprises at least one polymerizable functional group selected from an acryloyl group, a methacryloyl group, and a vinyl group.

4. The organic photoconductor of claim 1, wherein a mixing amount of the multifunctional spherical dendrimer in the polymer composition is about 10 percent by mass or greater and about 50 percent by mass or less based on the total of 100 percent by mass of the multifunctional spherical dendrimer, the first multifunctional acryl compound, and the second multifunctional acryl compound.

5. The organic photoconductor of claim 1,
wherein the silicon-containing group of the second multifunctional acryl compound comprises a dimethylsiloxane group,
wherein the fluorine-containing group of the second multifunctional acryl compound comprises at least one of a perfluoro polyether group or a perfluoro alkyl group, and
wherein the second multifunctional acryl compound comprises a polyacrylate unit.

6. The organic photoconductor of claim 1, wherein a mixing amount of the second multifunctional acryl compound in the polymer composition is about 5 percent by mass or greater and about 50 percent by mass or less based on the total of 100 percent by mass of the multifunctional spherical dendrimer, the first multifunctional acryl compound, and the second multifunctional acryl compound.

7. The organic photoconductor of claim 1, wherein the electrically conductive metal oxide particle comprises at least one of tin oxide, titanium oxide, indium oxide, zinc oxide, antimony oxide, phosphorus-containing tin oxide, or antimony-containing tin oxide.

8. The organic photoconductor of claim 1, wherein the electrically conductive metal oxide particle has an average primary particle diameter of about 5 nanometers or greater and about 300 nanometers or less.

9. The organic photoconductor of claim 1, wherein the electrically conductive metal oxide particle has an aspect ratio of 3 or more.

10. The organic photoconductor of claim 1, wherein a mixing amount of the electrically conductive metal oxide particles in the polymer composition is about 10 parts by mass or greater and about 40 parts by mass or less based on the total of 100 parts by mass of the multifunctional spherical dendrimer, the first multifunctional acryl compound, and the second multifunctional acryl compound.

11. The organic photoconductor of claim 1, wherein the electrically conductive metal oxide particle further comprises a silane coupling agent disposed on a surface thereof, wherein the silane coupling agent is a grafted aggregate comprising on a side chain a silane coupling part for coupling with the electrically conductive metal oxide, a photoreactive part, and a lubricious part including at least one of fluorine or silicon.

12. The organic photoconductor of claim 11, wherein the silane coupling agent is a grafted aggregate comprising an acryl main chain.

13. The organic photoconductor of claim 11, wherein the silane coupling part of the silane coupling agent comprises a part represented by Formula 3:

Formula 3 wherein, in Formula 3,
$R_1$ is an alkoxy group, and
a is an integer from 0 to 2.

14. The organic photoconductor of claim 13, wherein, in Formula 3, $R_1$ is a methoxy group, and a is 0.

15. The organic photoconductor of claim 11, wherein the photoreactive part of the silane coupling agent comprises a part represented by Formula 4:

$$—COO—NH—R_2—Y \qquad \text{Formula 4}$$

wherein, in Formula 4,
$R_2$ is an alkyl group, and
Y is a photoreactive functional group.

16. The organic photoconductor of claim 15, wherein, in Formula 4, Y is an acryloyl group or a methacryloyl group.

17. The organic photoconductor of claim 11, wherein the lubricious part of the silane coupling agent comprises a part represented by Formula 5:

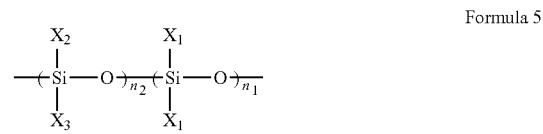

Formula 5 wherein, in Formula 5,
$X_1$ is an alkyl group,
$X_2$ and $X_3$ are each independently an alkyl group or an aryl group, and
$n_1$ and $n_2$ are each independently an integer from 1 to 500.

18. The organic photoconductor of claim 11, wherein the lubricious part of the silane coupling agent comprises a part represented by Formula 6:

Formula 6 wherein, in Formula 6, m is an integer from 1 to 400.

19. The organic photoconductor of claim 11, wherein the silane coupling agent has a weight average molecular weight in a range between about 300 Daltons and about 100,000 Daltons.

20. An electrophotographic apparatus comprising the organic photoconductor of claim 1.

21. A process cartridge comprising the organic photoconductor of claim 1.

* * * * *